RE 26036

July 9, 1963 J. RYWAK 3,097,313

RC-COUPLED MONOSTABLE TRANSISTOR CIRCUIT WITH DIODE SHUNT TO PROVIDE FAST RECOVERY TIME

Filed Nov. 9, 1960

INVENTOR
John RYWAK

Robert B. Harmon
atty.

3,097,313
Patented July 9, 1963

1

3,097,313

RC-COUPLED MONOSTABLE TRANSISTOR CIRCUIT WITH DIODE SHUNT TO PROVIDE FAST RECOVERY TIME

John Rywak, Ottawa, Ontario, Canada, assignor to Northern Electric Company Limited, Montreal, Quebec, Canada, a corporation of Canada Filed Nov. 9, 1960, Ser. No. 68,182
3 Claims. (Cl. 307—88.5)

This invention relates to multivibrator circuits and more particularly to such circuits employing transistors.

As is well known one of the limitations of transistors resides in the fact that the emission and control factors associated therewith depend markedly on the temperature at which the transistor operates. This is particularly true with respect to transistors employed in circuits for high power service wherein the heat liberated governs the stability of the circuit.

An object of this invention is to provide a multivibrator circuit employing transistors having temperature control means for improving the stability of the circuit.

Another object of this invention is to provide a multivibrator circuit employing transistors and having the foregoing characteristics in which a maximum power is transmitted to a load while maintaining the stability of the multivibrator circuit.

A further object of this invention is to provide a multivibrator circuit, employing transistors, that is not subject to transient triggering by noise in the power supply.

These and other objects of the invention are attained by providing a pair of transistors cross-coupled together to form a multivibrator circuit having unilateral directional means whereby the resistor-capacitor elements are disconnected during the operate time of the circuit.

Figure 1:
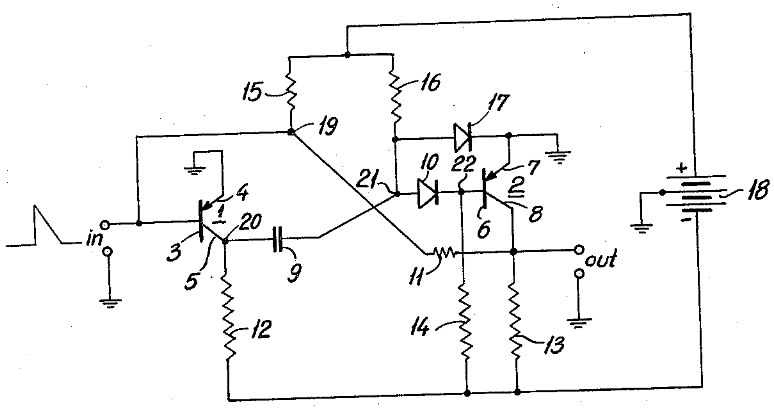
Figure 2:
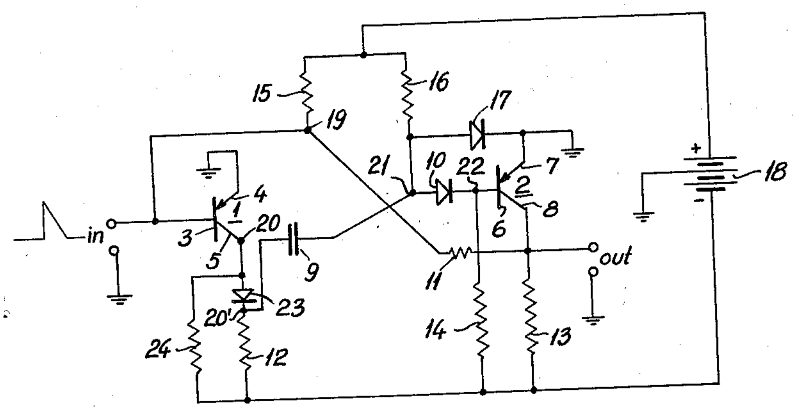

A better understanding of the invention may be had by referring to the following description, taken in conjunction with the drawings, in which like numerals refer to like parts, in which:

FIG. 1 illustrates a circuit schematic diagram of a multivibrator circuit in which the invention is represented, and FIG. 2 illustrates a circuit schematic diagram of a multivibrator circuit showing another embodiment of the invention.

Considering the drawings, there is shown a first and second semi-conductive device 1, 2 each having respectively a base, emitter and collector electrode 3, 4, 5 and 6, 7, 8. The transistors are cross connected by providing a coupling means connected between the collector electrode 5 of one of the transistors 1 and the base electrode 6 of the other transistor 2, which coupling includes the capacitor 9 and the unilateral directional element 10 connected between the capacitor 9 and the base electrode 6 of the transistor 2, the unilateral element being so poled as to prevent the flow of current in the coupling during the operate or the time when transistor 2 is conducting, and a coupling means connected between the collector 8 of transistor 2 and the base 3 of the said one transistor 1, this coupling including the resistor 11. Also shown in the drawing are collector biasing resistors 12, 13 connected to the collector electrodes 5, 8 respectively, bias resistor 14 connected to the base electrodes 6 of transistor 2, base biasing resistors 15, 16 connected to the base 3 of transistor 1 and to the anode of the unilateral element 10. Also shown is unilateral device 17 connected back to back with unilateral device 10 with its cathode connected to the emitter electrode 7 of transistor 2. A source 18 provides energy for the circuit. The numerals 19, 20, 21 and 22 indicate points of reference potential.

The monostable circuit shown in FIG. 2 is the same as the monostable circuit shown in FIG. 1 with the exception that a unilateral device 23 and a resistor 24, connected together in series relation, are connected in shunt relation with the collector resistor 12.

2

Representative values for the resistance of the resistors and the capacitance of the capacitors, employed in the circuits described are:

| | |
|---|---|
| Resistor: | |
| 11 | 22K. |
| 12 | 3.3K. |
| 13 | 3.3K. |
| 14 | 47K. |
| 15 | 56K. |
| 16 | 12K. |
| 24 | 68K. |
| Capacitor: | |
| 9 | .0047 mf. |

The following is the operation of the circuits.

*Stand By Condition*

In this condition, FIG. 1, the circuit 18—15—11—13—18 is completed so that the reference point of potential 19 is negative with respect to ground allowing a forward bias to be applied to the base 3 of transistor 1 which conducts.

The circuit 18—16—10—14—18, which is the biasing circuit for transistor 2, is not completed since diode 10 does not conduct due to resistor 16 being smaller in resistance value than resistor 14. Transistor 2 is therefore non-conducting at this stage of the operation.

*Triggered Condition*

When a positive pulse is applied to the base electrode 3 of transistor 1, this transistor 1 is cut off allowing its collector voltage at the reference point of potential 20 to fall. Due to this fall of potential at the point of reference 20, and the capacitance coupling by capacitor 9, diodes 10 and 17 are back biased. Since the circuit 18—16—10—14—18 is open circuited due to the diode 10 being non-conducting, transistor 2 will conduct due to the point of reference potential 22 falling, as determined by the resistor 14. When transistor 2 conducts potential at the collector electrode 8 of transistor 2 rises to approximately ground level which, when applied through resistor 11 to the base electrode 3, holds transistor 1 non-conducting.

*Operate Condition*

At this point of the operation, capacitor 9 charges through the circuit 18—16—9—12—18, the point of reference potential 20—21 becoming more negative and positive respectively. When the points of reference 21 reaches ground potential, diodes 10 and 17 will become forward biased so the point of reference potential 22 becomes approximately ground and reverse-biases the base-emitter junction of transistor 2. When transistor 2 becomes non-conducting, the point of reference potential 19 becomes negative through the action of resistor 11 and the falling potential of collector 8 of transistor 2 so that transistor 1 conducts again. When transistor 1 becomes saturated, capacitor 9 discharges through diode 10 and resistor 14 to the negative side of power supply 18 and through diode 17 to ground. Diode 17 carries the major portion of the capacitor discharge current and is the prime determining factor for the multivibrator "recovery time." For example, an "operate" to "recovery time" ratio of 10:1 may be obtained through the use of this diode as described.

It will be noted that during the operate time when transistors 1 and 2 are non-conducting and conducting respectively, and capacitor 9 charging, that the only temperature dependent effects on the charging of the capacitor 9, is due to the collector circuit of transistor 1 at the point of reference potential 20 and the leakage currents of diodes 10 and 17. Both of these currents are negligible over a wide temperature range because of the relatively large charging currents supplied through resistors 12 and 16.

Consider FIG. 2, the circuit described is the same as that described for FIG. 1 except that when transistor 1 becomes non-conducting the point of reference potential 20 will fall towards the negative potential of supply 18, the value of which will be determined by the product of the resistor 24 and the collector leakage current of transistor 1. The potential at 20′ will be determined, as in FIG. 1, by the values of resistors 12 and 16 and the voltage across capacitor 9. It will be observed that by proper choice of resistors 12, 16 and 24 the potential at 20 will be more negative than the potential at 20′ during the whole of the "operate" period causing diode 23 to be back-biased. Therefore, the complete resistor-capacitor circuit, 16, 24, and 9, is disconnected from both transistor 1, 2 while the monostable circuit is in its operate phase. Thus the charging of capacitor 9 will be effected only to a very small extent by the leakage currents of diodes 10, 17, 23.

What is claimed is:

1. A monostable transistor circuit comprising in combination:

(*a*) a first and second semiconductor device each having a base, emitter and collector electrode, (*b*) a capacitor and a first unidirectional means connected in series between the collector electrode of the first semiconductor device and the base electrode of the second semiconductor device, so that the cathode and anode of the unidirectional means are connected to the base electrode of the second semiconductor device and the capacitor respectively, (*c*) a first resistor connected between the collector electrode of the second semiconductor device and the base electrode of the first semiconductor device, (*d*) a source of potential, (*e*) a second resistor connected to a first terminal of the source, poled to apply a predetermined potential thereto, and to the base electrode of the first semiconductor device, (*f*) a third resistor connected to the first terminal of the source and to the anode of the unidirectional means, (*g*) a fourth and fifth resistor individually connected to the other terminal of the source and to the collector electrodes of the first and second semiconductor devices respectively, (*h*) a sixth resistor connected to the other terminal of the source and to the base electrode of the second semiconductor device, (*i*) means for grounding the emitter electrodes of the transistors.

2. A monostable transistor circuit defined in claim 1 having in combination therewith:

(*a*) a second unidirectional means connected back to back with said first unidirectional means and the emitter electrode of the said second transistor.

3. A monostable transistor circuit defined in claim 2 having in combination therewith:

(*a*) a third unidirectional means connected between the said capacitor and the collector electrode of the first semiconductor device so that the anode and cathode of the unidirectional means is connected to the collector electrode of the first semiconductor device and to the capacitor respectively, (*b*) a seventh resistor shunted across the third unidirectional means and the fourth resistor.

References Cited in the file of this patent

UNITED STATES PATENTS

| | | |
|---|---|---|
| 2,850,630 | Prugh | Sept. 2, 1958 |
| 2,984,754 | Wolfe | May 16, 1961 |